United States Patent
Cui et al.

(10) Patent No.: US 11,882,158 B2
(45) Date of Patent: Jan. 23, 2024

(54) METHODS, SYSTEMS, AND DEVICES TO DYNAMICALLY DETERMINE AN AUTHENTICATION METHOD FOR A USER DEVICE TO ACCESS SERVICES BASED ON SECURITY RISK

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Sangar Dowlatkhah, Johns Creek, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 234 days.

(21) Appl. No.: 16/903,528

(22) Filed: Jun. 17, 2020

(65) Prior Publication Data
US 2021/0400087 A1    Dec. 23, 2021

(51) Int. Cl.
*H04L 9/40* (2022.01)
*G06N 20/00* (2019.01)

(52) U.S. Cl.
CPC .......... *H04L 63/205* (2013.01); *G06N 20/00* (2019.01); *H04L 63/083* (2013.01); *H04L 63/0861* (2013.01); *H04L 2463/082* (2013.01)

(58) Field of Classification Search
None
See application file for complete search history.

(56) References Cited

U.S. PATENT DOCUMENTS

| | | | | |
|---|---|---|---|---|
| 9,160,726 | B1 * | 10/2015 | Kaufman | H04L 63/08 |
| 10,057,227 | B1 * | 8/2018 | Hess | G06F 21/31 |
| 10,405,186 | B1 * | 9/2019 | Latsha | H04W 8/183 |
| 10,432,605 | B1 * | 10/2019 | Lester | G06F 21/552 |
| 10,972,458 | B1 * | 4/2021 | Gaeta | G06F 21/32 |
| 2002/0087894 | A1 * | 7/2002 | Foley | H04L 63/0853 726/4 |
| 2014/0208419 | A1 * | 7/2014 | Chang | G06F 21/31 726/21 |
| 2015/0324559 | A1 * | 11/2015 | Boss | G06Q 50/01 726/1 |

(Continued)

*Primary Examiner* — Saleh Najjar
*Assistant Examiner* — Shadi H Kobrosli
(74) *Attorney, Agent, or Firm* — Guntin & Gust, PLC; Mark Wilinski

(57) ABSTRACT

A device, method or executable instructions that include receiving, over a network, an authentication request from a user device for performing a function utilizing a first authentication method, obtaining network intelligence data for a mobile network over the network, and identifying a risk for each of multiple authentication methods in response to analyzing device security behavior and the network intelligence data. Further embodiments include identifying a first risk for the first authentication method and identifying a second risk for the function, determining the first risk is higher than the second risk, and identifying a second authentication method that is associated with the second risk. Additional embodiments include notifying the user device of the second risk for the function, and providing a recommendation to the user device to utilize the second authentication method to perform the function. Other embodiments are disclosed.

20 Claims, 9 Drawing Sheets

(56) References Cited

U.S. PATENT DOCUMENTS

| | | | |
|---|---|---|---|
| 2018/0139606 A1* | 5/2018 | Green | H04W 12/06 |
| 2018/0248863 A1* | 8/2018 | Kao | H04L 63/102 |
| 2019/0333055 A1* | 10/2019 | Mohammed | H04L 9/3271 |
| 2021/0168148 A1* | 6/2021 | Boodaei | H04L 63/0861 |
| 2021/0306372 A1* | 9/2021 | Koral | H04L 43/16 |

* cited by examiner

| Function | Risk Level |
|---|---|
| Sharing Bank Account Information | Risk Level 1 |
| Sharing Payment Information | Risk Level 2 |
| Accessing Email Service | Risk Level 3 |
| Sharing Social Media Content | Risk Level 4 |
| Accessing Media Content | Risk Level 5 |

| Risk Level | Authentication Method/Service | Authentication Method Type |
|---|---|---|
| Risk Level 1 | Banking Service | Facial Identification |
| Risk Level 2 | Email Provider Service | Multifactor Authentication |
| Risk Level 4 | Social Media Service | User Credentials |

Risk Levels for First Time Period 247

| Function | Risk Level |
|---|---|
| Sharing Bank Account Information | Risk Level 1 |
| Sharing Payment Information | Risk Level 2 |
| Accessing Email Service | Risk Level 3 |
| Sharing Social Media Content | Risk Level 4 |
| Accessing Media Content | Risk Level 5 |

| Risk Level | Authentication Method/Service | Authentication Method Type |
|---|---|---|
| Risk Level 1 | Banking Service | Facial Identification |
| Risk Level 1 | Email Provider Service | Multifactor Authentication |
| Risk Level 2 | Social Media Service | User Credentials |

Risk Levels for Second Time Period 249

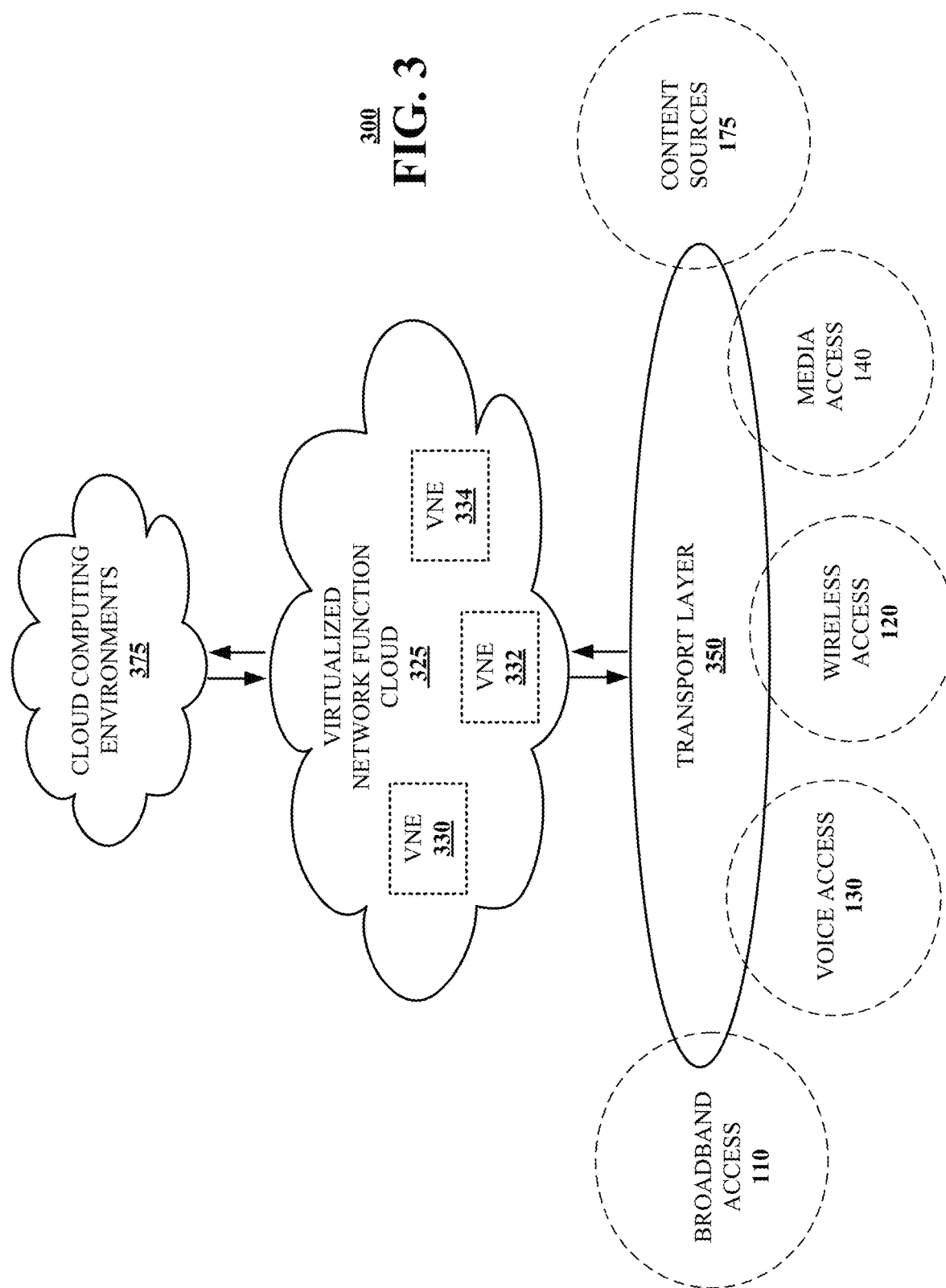

METHODS, SYSTEMS, AND DEVICES TO DYNAMICALLY DETERMINE AN AUTHENTICATION METHOD FOR A USER DEVICE TO ACCESS SERVICES BASED ON SECURITY RISK

FIELD OF THE DISCLOSURE

The subject disclosure relates to methods, systems, and devices to dynamically determine an authentication method for a user device to access services based on security risk.

BACKGROUND

Many devices such as web servers and network devices allow access to user devices utilizing different authentication methods to perform functions. One authentication method can be accessing a web server for one service to perform a function with user credentials (e.g., username and password) from another service. For example, a user device can provide user credentials for a social media service to access a web server for a travel service to perform the function of reserving a hotel room or to perform the function of providing payment information. Another example can include a user device providing user credentials for an email service provider to access a media content service to perform the function of creating a user profile or to perform the function of streaming media content. Services such as travel services and media content services allow user devices to access them utilizing third-party user credentials (e.g., social media, email service provider, etc.) for user convenience and to provide a lower barrier for user acquisition and user retention of their services.

BRIEF DESCRIPTION OF THE DRAWINGS

Reference will now be made to the accompanying drawings, which are not necessarily drawn to scale, and wherein:

FIGS. 2A-2C are block diagrams illustrating example, non-limiting embodiments of systems functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
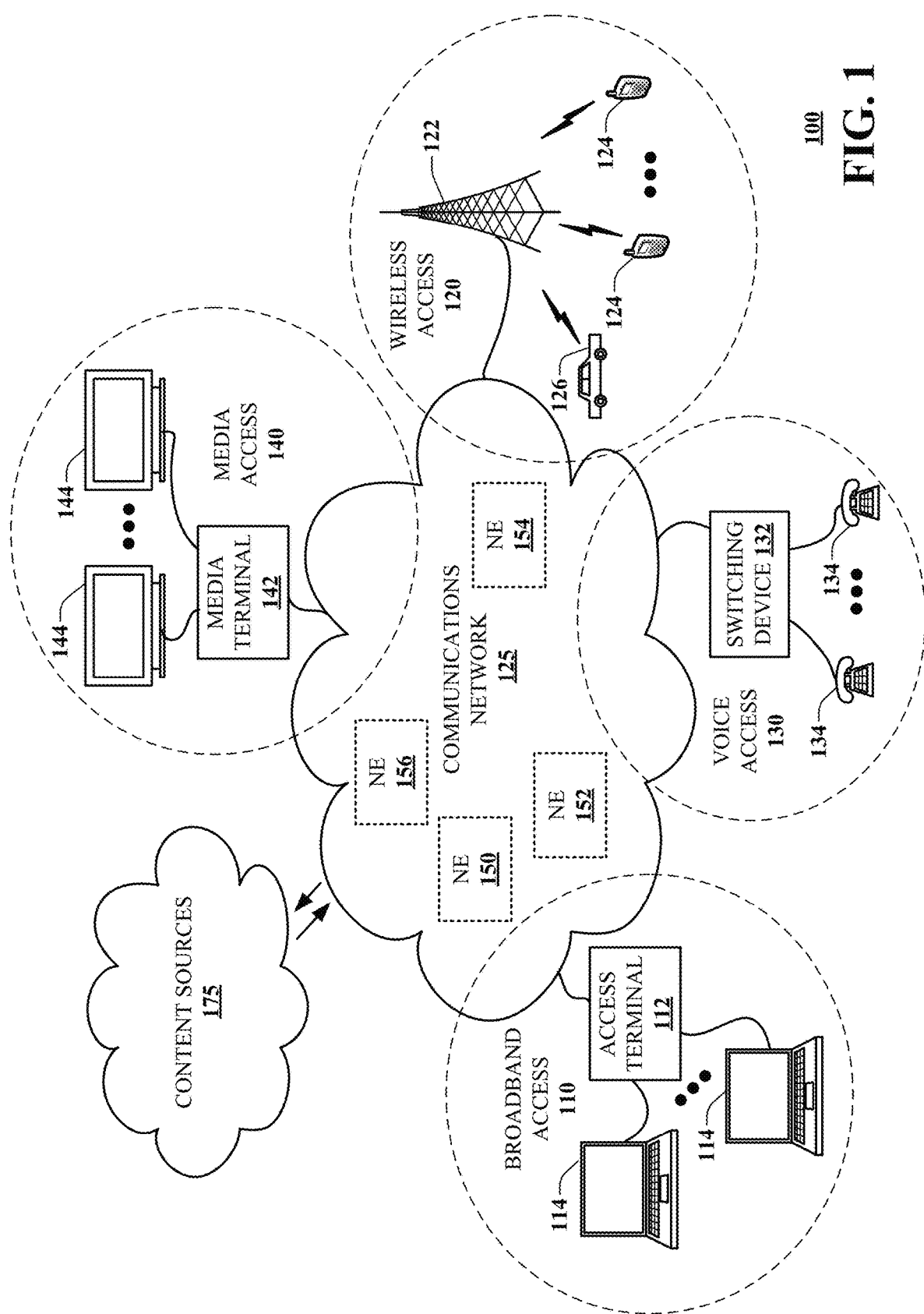
FIG. 1 is a block diagram illustrating an exemplary, non-limiting embodiment of a communications network in accordance with various aspects described herein.

The subject disclosure describes, among other things, illustrative embodiments for receiving, over a communication network, an authentication request from a user device for performing a function utilizing a first authentication method, obtaining network intelligence data for a mobile network over the communication network, and identifying a risk level for each of a plurality of authentication methods resulting in a plurality of risk levels in response to analyzing device security behavior and the network intelligence data using a machine learning application. The first authentication method is one of the plurality of authentication methods. Further embodiments include identifying a first risk level for the first authentication method and identifying a second risk level for the function, determining the first risk level is higher than the second risk level, and identifying a second authentication method from the plurality of authentication methods that is associated with the second risk level. Additional embodiments include notifying the user device of the second risk level for the function, and providing a recommendation to the user device to utilize the second authentication method to perform the function. Other embodiments are described in the subject disclosure.

One or more aspects of the subject disclosure include a device, comprising a processing system including a processor, and a memory that stores executable instructions that, when executed by the processing system, facilitate performance of operations. Operations can comprise receiving, over a communication network, an authentication request from a user device for performing a function utilizing a first authentication method, obtaining network intelligence data for a mobile network over the communication network, and identifying a risk level for each of a plurality of authentication methods resulting in a plurality of risk levels in response to analyzing device security behavior and the network intelligence data using a machine learning application. The first authentication method is one of the plurality of authentication methods. Further operations can comprise identifying a first risk level for the first authentication method and identifying a second risk level for the function, determining the first risk level is higher than the second risk level, and identifying a second authentication method from the plurality of authentication methods that is associated with the second risk level. Additional operations can comprise notifying the user device of the second risk level for the function, and providing a recommendation to the user device to utilize the second authentication method to perform the function.

One or more aspects of the subject disclosure include a machine-readable medium, comprising executable instructions that, when executed by a processing system including a processor, facilitate performance of operations. Operations can comprise receiving, over a communication network, an authentication request from a user device for performing a function utilizing a first authentication method, obtaining network intelligence data for a mobile network over the communication network, and identifying a risk level each of a plurality of authentication methods resulting in a plurality of risk levels in response to analyzing processing system security behavior and the network intelligence data using a machine learning application. The first authentication method is one of the plurality of authentication methods. Further operations can comprise identifying a first risk level for the first authentication method and identifying a second risk level for the function, and identifying a second authentication method from the plurality of authentication methods that is associated with the second risk level. Additional operations can comprise identifying a risk threshold, determining the first risk level is above the risk threshold and the second risk level is below the risk threshold, and determining an amount of risk between the first risk level and risk threshold. Also, operations can comprise terminating an access point device associated with a first service based on the amount of risk, notifying the user device of the second risk level for the function, and providing a recommendation to the user device to utilize the second authentication method to perform the function.

One or more aspects of the subject disclosure include a method. The method can comprise receiving, by a processing system including a processor, over a communication network, an authentication request from a user device for performing a function utilizing a first authentication method, obtaining, by the processing system, network intelligence data for a mobile network over the communication network, and identifying, by the processing system, a risk level for each of a plurality of authentication methods resulting in a plurality of risk levels in response to analyzing processing system security behavior and the network intelligence data using a machine learning application. The first authentication method is one of the plurality of authentication methods. Further, the method can comprise identifying, by the processing system, a first risk level for the first authentication method and identifying a second risk level for the function, identifying, by the processing system, a second authentication method from the plurality of authentication methods that is associated with the second risk level. In addition, the method can comprise identifying, by the processing system, a risk threshold, and determining, by the processing system, the first risk level is above the risk threshold and the second risk level is below the risk threshold. Also, the method can comprise notifying, by the processing system, the user device of the second risk level for the function, and providing, by the processing system, over the communication network, a recommendation to the user device to utilize the second authentication method to perform the function. Further, the method can comprise determining, by the processing system, the first risk level has decreased below the risk threshold, the first authentication method is associated with a first service, receiving, by the processing system, over the communication network a first notification that another processing system has terminated an access point device for the first service, and providing, by the processing system, over the communication network, a second notification to each of a group of user devices associated with the other processing system. Each of the group of user devices are using the first service and the second notification indicates that the processing system offers the first service to each of the group of user devices as the other processing system.

Referring now to FIG. 1, a block diagram is shown illustrating an example, non-limiting embodiment of a communications network 100 in accordance with various aspects described herein. For example, communications network 100 can facilitate in whole or in part determining an authentication method to access a service on a network device based on a security risk and providing a recommendation for another authentication method to access the service. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
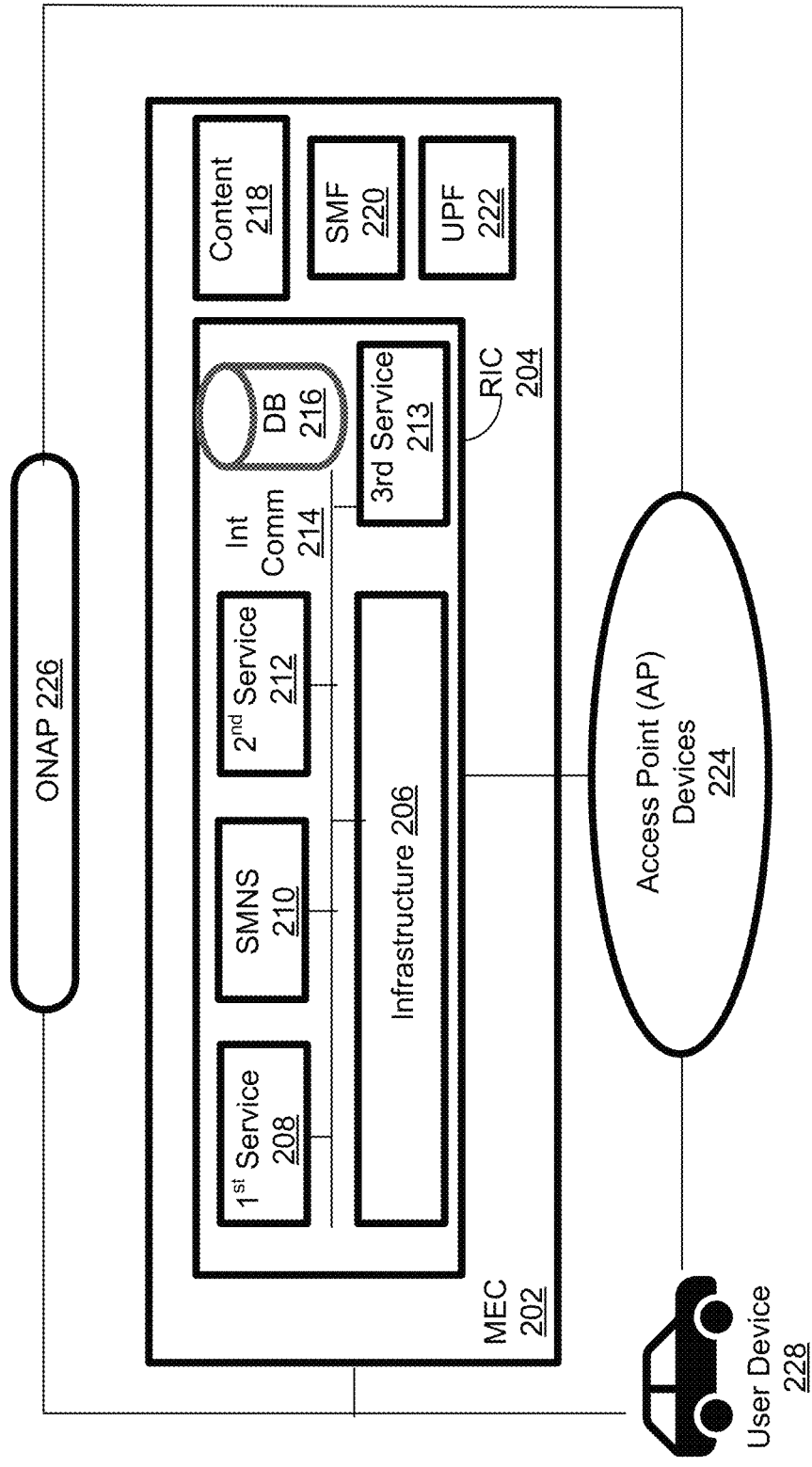
Figure 2B:
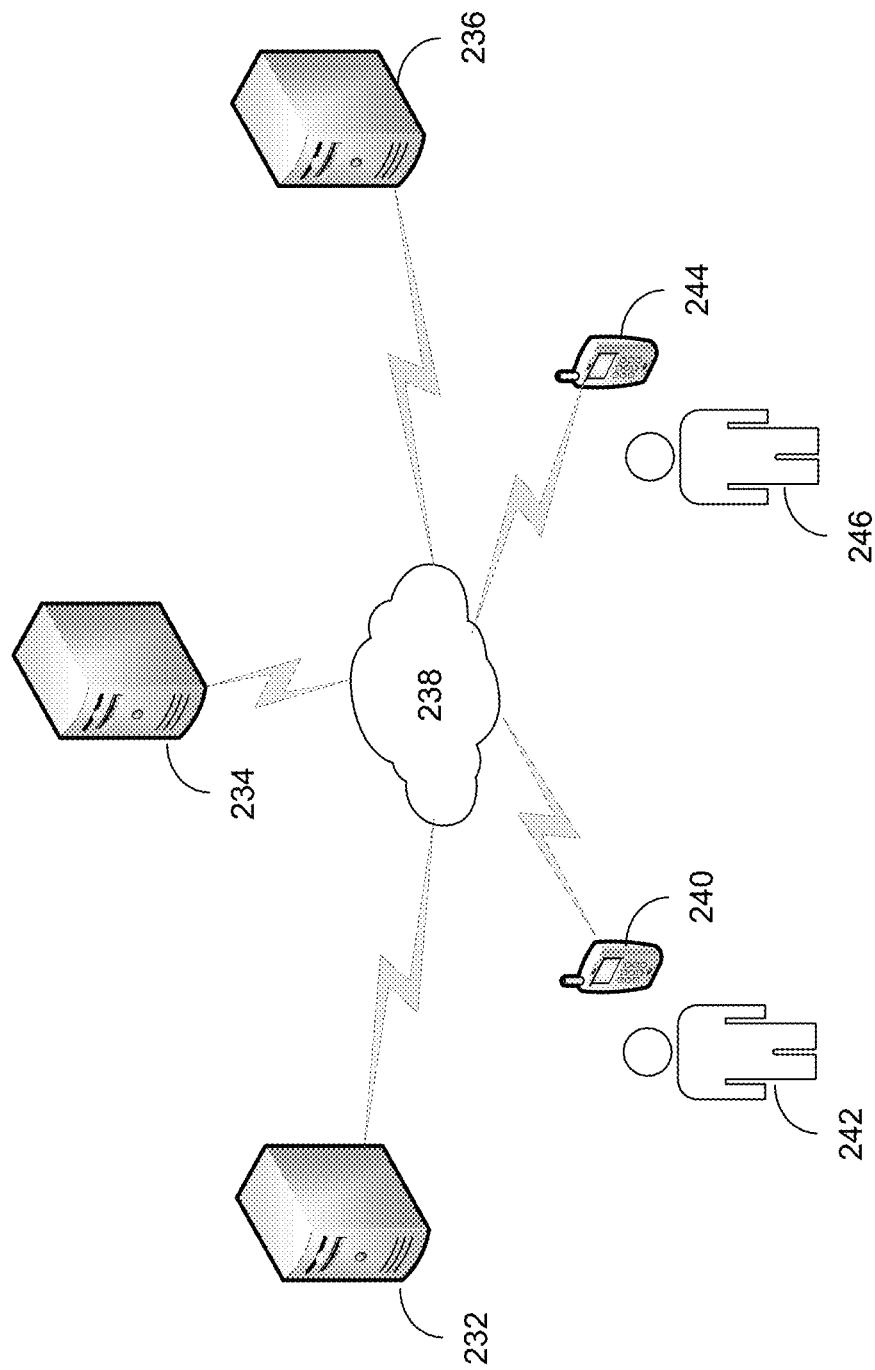

FIGS. 2A-2C are block diagrams illustrating example, non-limiting embodiments systems functioning within the communication network of FIG. 1 in accordance with various aspects described herein. Referring to FIG. 2A, in one or more embodiments, system 200 includes a portion of a mobile network (e.g., 6G, etc.) that comprises computing devices of an Open Network Application Platform (ONAP) 226, a Multi-access Edge Computing (MEC) device 202, a group of access point (AP) devices 224, and user device 228. Communication between the ONAP 226, MEC device 202, AP devices 224, and user device 228 is provided over communication network. Such a communication network can be a wireless communication network, wired communication network, or a combination thereof. In some embodiments, a portion of the mobile network can comprise a portion of the communication network. The user device 228 can include a mobile device such as a mobile phone, smartphone, tablet computer, laptop computer, wearable device, smartwatch, fitness tracker, vehicle navigation system, vehicle entertainment system each carried in or part of a vehicle as well as a desktop computer, end device, terminal device, Internet of Things (IoT) device, or any other computing device associated with a user. Although one user device 228 is shown in FIG. 2A, multiple user devices can be communicatively coupled to the MEC device 202 via one or more AP devices 224. Further, an AP device of the group of AP devices 224 can facilitate access of an application or service by a user device 228 from the MEC device 202. In some embodiments, an AP device can be a virtual device. In addition, the MEC device 202 comprises a content engine 218, a session management function (SMF) 220, a user plane function (UPF) 222, and a radio intelligent controller (RIC) 204. Also, the MC 204 comprises a first service engine 208, a second service engine 212, a third service engine 213, a security monitoring and notification system (SMNS) 210, a database 216, and infrastructure 206, all of which are communicatively coupled using an internal communication system 214 (e.g., communication bus). Further, the RIC 204 is communicatively coupled to the AP devices 224 over the communication network. In addition, the database 216 can store information or data for the first service engine 208, the second service engine 212, third service engine 213, and the SMNS 210. In some embodiments, the MEC device 202 can be a virtual device in which its components and functions can be spread across several different devices communicatively coupled over the communication network.

In one or more embodiments, there can be different ways to perform authentication for a user device 228 to gain access to applications/services to perform functions associated with either the first service engine 208 or the second service engine 212 included in the MEC device 202 such as using application/services specific credentials (e.g., Netflix™, Google™, Facebook™, Yahoo™, etc.). At any given time, there can be more than one authentication method available to a user device 228 to access the applications/services provided by the first service engine 208 or second service engine 212 to perform functions. In addition, the network elements (virtual or physical) including MEC device 202, millimeter wave (mmW) small cells and various AP devices 224 as well as user devices 228, might pose a risk to the overall network security.

In one or more embodiments, the MEC device 202 can include an artificial intelligence/machine learning based SMNS 210 that is supported by the RIC 204 as part of the mobile network. The SMNS 210 can be used to analyze the risk level of each authentication method at a per device, per application level (or per function), and dynamically instruct the user device 228 to choose the authentication method with a low level (i.e., a risk level below a risk threshold) to gain access to application/services provided by the first service engine 208, the second service engine 212, or third service engine. Further, the SMNS 210 can be used to detect, analyze the risk exposed to a network element (virtual or physical) including the MEC device 202, mmW small cells, various AP devices 224, and user device 228 as well as trigger actions to protect the mobile network or system 200.

In one or more embodiments, the SMNS 210 can utilize pattern matching and analysis using an artificial intelligence/machine learning application to determine the risk level of each authentication method at a per device, per application level (or per function), including pattern and profile. Further, based on such an analysis, the SMNS 210 can identify a potential security risk and the risk level for an authentication method (e.g., well-known/high risk, well-known/low risk, unknown/high risk, etc.) on a per device, per application level (or per function). In addition, the artificial intelligence/machine learning based SMNS 210 can also analyze network element security behavior include user plane behavior and control plane behavior of the mobile network as well as compare to network intelligence data. Further, network intelligence data can include historical data of a plurality devices accessing services on the mobile network, events occurring in the mobile network, time of day data associated with the plurality of user device accessing the services on the mobile network, trending data associated with the plurality of user devices accessing the services on the mobile network, or a combination thereof to identify potential security risk and/or risk level. Further, the SMNS 210 of the MEC device 202 can communicate with an SMNS of other MEC devices or other network devices to obtain the network intelligence data.

In one or more embodiments, based on the potential risks identified, the SMNS 210 notifies the user device 228 of the risk level (e.g., well-known/high risk, well known/low risk, unknown/high risk, etc.) to perform a function and dynamically instructs the user device 228 to choose a higher security authentication method (with a lower risk level) to gain access to the applications/services to perform functions. That is, the initial authentication method can have a risk level above a risk threshold and the a subsequently chosen authentication method can have a risk level below a risk threshold. Further, based on the potential risks identified, the SMNS 210 may trigger proper actions, which may include recommending another authentication method with a lower risk level, if the amount of risk is high enough (i.e., above a risk threshold), terminating operations of an AP device to the application/service and/or terminate operations of the network element such as MEC device 202 to limit the risk exposure of the MEC device 202 specifically or the mobile network generally.

For example, the first service engine 208 can be associated with a social media company (e.g., Facebook™) and the second service engine 212 can be associated with an email provider (Google™ Gmail™). A user associated with the user device 228 causes a transmission of an authentication request to access a third service engine 213 associated with a media content provider (e.g., Netflix™). However, the user device can perform different functions associated with third service (media content provider). One function can be to provide payment information (e.g., credit card information, electronic payment information (e.g., Paypal, Venmo, etc.) etc.) while another function can be to, access, stream, or download media content. Each function associated with the third service can be determined by the SMNS 210 to be associated with a different risk level. For example, the function of providing payment information can be determined to be associated with tolerating a low risk level while the function of accessing, streaming, or downloading media content can be determined to be associated with tolerating a higher risk level.

Further, the user associated with the user device 228 prefers to gain access to the media content provider's application/service utilizing an authentication method (e.g., user credentials) for a social media company associated with the first service engine 208. The SMNS 210 of MEC device 202 can communicate with other user devices communicatively coupled with the MEC device 202 and with counterpart SMNS in other MEC devices in the network or system 200 and determines that there may have been a possible security breach associated with the social media company. An exemplary security breach can include a hacker obtaining user credentials for a portion of users of the social media company. In some embodiments, such a determination can be made by detecting a pattern that users who usually utilize user credentials associated with the social media company are no longer utilizing them, and instead are using other authentication methods.

Analysis by the SMNS 210 to determine the risk level of the authentication method associated with the social media company can also include analyzing the device security behavior. Further, the device security behavior can include user plane behavior of the mobile network and/or control plane behavior on the mobile network. For example, the SMNS 210 can detect on the user plane and/or control plane messages that indicate a security breach or security risk associated with the authentication method for the social media service. Also, the SMNS 210 can obtain and analyze network intelligence data to determine the risk level of the authentication method for the social media company. Any analysis performed by the SMNS 210 can use one or more artificial intelligence/machine learning applications.

Referring to FIGS. 2B and 2C, in one or more embodiments, the system 230 can include MEC devices 232, 234, 236 and user devices 240, 244 associated with users 242, 246, all of which are communicatively coupled to each other over communication network 238. Further, the communication network 238 can comprise a wireless communication network, wired communication network, or a combination thereof. The user devices 240, 244 can include a mobile device such as a mobile phone, smartphone, tablet computer, laptop computer, wearable device, smartwatch, fitness tracker, vehicle navigation system, vehicle entertainment system each carried in or part of a vehicle as well as a desktop computer, end device, terminal device or any other computing device associated with a user. An analysis of the device security behavior and the network intelligence data may result in an exemplary risk analysis for a first time period shown in chart 247 in FIG. 2C. The risk analysis can result in five different risk levels for different types of functions that can be performed as part of accessing different services. Each function can be performed utilizing an authentication method for a service (e.g., banking service, email provider service, social media service, etc.), each with authentication method type (facial identification, multifactor authentication, user credentials, etc.). For example, if a user would like to perform a function of sharing of bank account information over a communication network, the risk analysis determines that it can tolerate the least risk and has a lowest risk level (e.g., risk level 1). Further, the risk analysis determines that each risk level can be associated with an authentication method for a service. In addition, the risk analysis identifies an authentication method type associated with each authentication method. For example, an authentication method for a banking service is associated with a lowest risk level (e.g., risk level 1) and the authentication method that is associated with the lowest risk lever is a facial identification authentication method type because it is considered the most secure among the different authentication method types (e.g., facial recognition, multifactor authentication, user credentials, etc.).

In another example, an MEC device can receive, over a communication network, an authentication request from a user device to perform a payment function (e.g., sharing credit card information) associated with a media content provider service utilizing an authentication method associated with a social media service. Further, the MEC device can obtain network intelligence data for a mobile network over the communication network. In addition, the MEC device can identify a risk level for each of a plurality of authentication methods resulting in a plurality of risk levels (as shown in chart 247) in response to analyzing MEC device security behavior and the network intelligence data using one or more machine learning or artificial intelligence applications. Also, the MEC device can identify a risk level associated with the authentication method for the social media service (e.g., risk level 4), which is one of the plurality of authentication methods. The MEC device can also identify the risk level for the payment function (e.g., risk level 2). In further embodiments, the MEC device can determine the risk level for the authentication method associated with the social media service (e.g., risk level 4) is higher than as the risk level identified for the function (e.g., risk level 2). In addition, the MEC device can identifying another authentication method from the plurality of authentication methods that is associated with the risk level for the function (e.g., multifactor authentication for risk level 2). Also, the MEC device can notify the user device of the risk level for the function and provide a recommendation to the user device to utilize the authentication method (e.g., multifactor authentication associated with the email provider service) associated with the risk level of the function.

In some embodiments, the MEC device can identify a risk threshold for the function. For example, the risk threshold for sharing payment information can be risk level 3. Further, the MEC device can determine the risk level for the authentication method for the social media service is above the risk threshold (e.g., risk level 4). In addition, the MEC device can identify an authentication method corresponding to the risk level of the function such as the authentication method associated with an email provider service (e.g., risk level 2), which is below the risk threshold. Also, the MEC device can notify the user device of the risk level for the function and recommend the authentication method for the email provider service that is associated with the risk level for the function.

In one or more embodiments, the MEC device can determine an amount of risk between the risk level of the authentication method for the social media service and the risk threshold. For example, the risk level for the social media service can be risk level 10 and the risk threshold can be risk level 3. Thus, the amount of risk between the risk level for the social media service and the risk threshold is 7 levels. The MEC device can be configured to trigger an alert if the amount of risk is above a certain amount/threshold (e.g., 5 levels). Further, the MEC device can determine that many user devices (e.g., 102 user devices) utilize the authentication method for the social media service. The number of user devices can be above a first threshold (e.g., 25 user devices) indicating a security risk at the MEC device associated with the social media service. Thus, the MEC device can terminate operations of the access point associated with the social media service based on the amount of risk between the risk level for the authentication method of the social media service (e.g., 7 levels) is above a threshold (e.g., 5 levels) and/or the number of user devices (e.g., 102 user devices) is above the first threshold (e.g., 25 user devices) utilizing the authentication method for the social media service. In addition, the number of user devices (e.g., 102 user devices) utilizing the authentication method for the social media service, at the MEC device, can be above a second threshold (e.g., 100 user devices—higher than the first threshold) indicating a security risk to the MEC device overall. Thus, the MEC device can terminate operations of itself based on the amount of risk between the risk level for the authentication method of the social media service (e.g., 7 levels) is above a threshold (e.g., 5 levels) and/or the number of user devices (e.g., 102 user devices) is above the second threshold (e.g., 100 user devices) utilizing the authentication method for the social media service at the MEC device itself.

In one or more embodiments, the MEC device can determine the risk level of the authentication method associated with the social media service has decreased below the risk threshold for a second time period (see chart 249 in FIG. 2C). Thus, the MEC device can reinstate the use of the authentication method for the social media service. Further, such reinstatement of use can include reinstating operations of the access point device associated with the social media service if it was previously terminated by the MEC device. Further, the MEC device can receive over the communication network a notification from another MEC device that has terminated its access point device for the social media service. In addition, the MEC device can provide, over the communication network, a notification to each of a group of device associated with the other MEC device that are/were using the social media service via the other MEC device the notification indicating that the MEC device offers the social media service to each of the group of user devices as the other MEC device.

In one or more embodiments, the first authentication method comprises username/password credentials for a first service (e.g., social media service). The identifying of the first risk level comprises detecting a security breach for the first service. The second authentication method comprises user/name credentials for a second service (e.g., email provider service). In other embodiments, the first authentication method comprises username/password credentials for a first service (e.g., social media service). The identifying of the first risk level comprises detecting a security breach for the first service. The second authentication method comprises user/name credentials associated with the MEC device. Possible authentication methods for the user device can include, but not limited to, e.g., facial recognition, multifactor authentication, user credentials (i.e. user name and password), personal identification number (PIN)), etc. In additional embodiments, the first authentication method comprises username/password credentials for a first service (e.g., social media service). The identifying of the first risk level comprises detecting a security breach for the first application. The second authentication method comprises multifactor authentication.

Figure 2D:
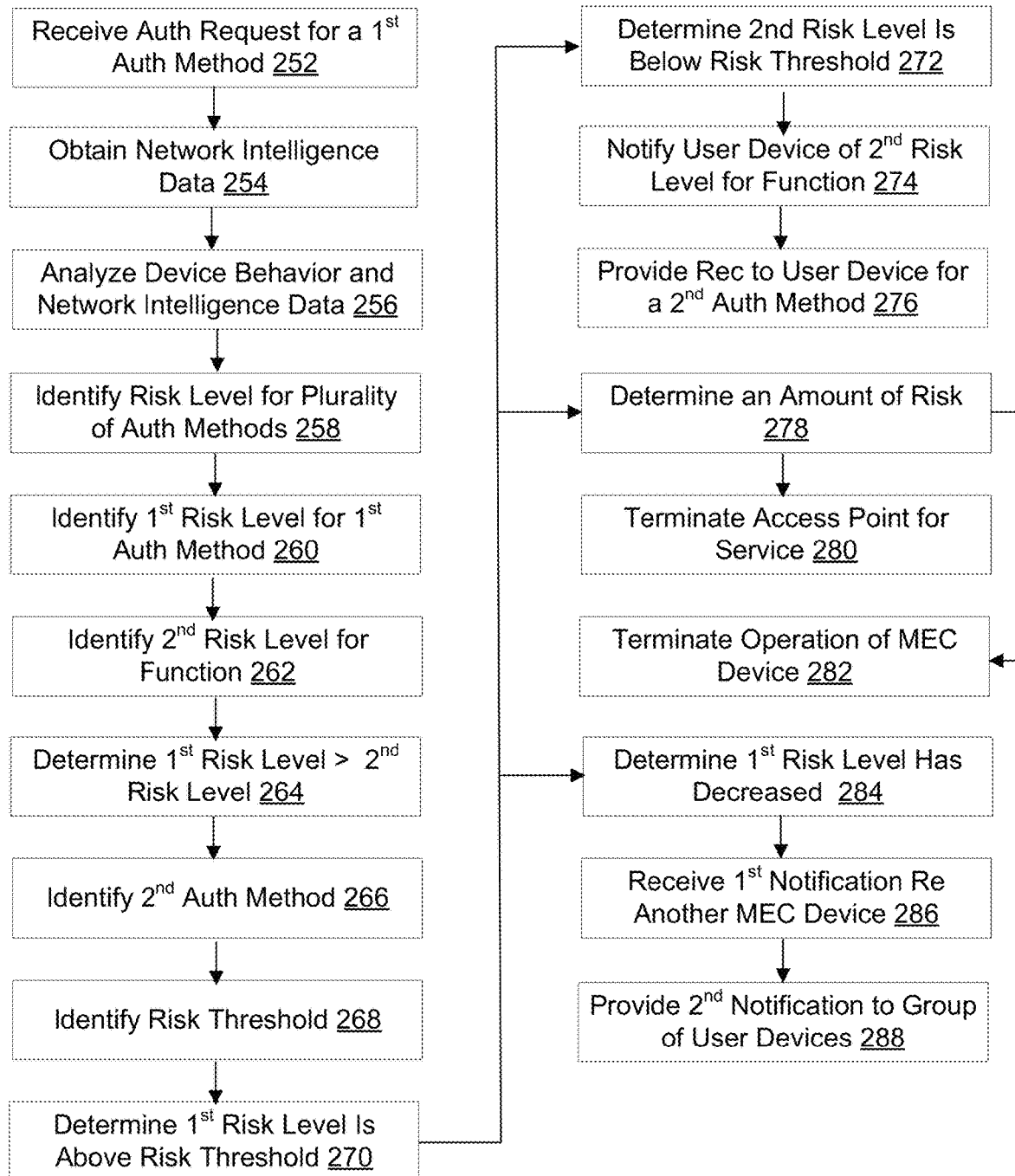
FIG. 2D depicts an illustrative embodiment of a method in accordance with various aspects described herein.

FIG. 2D depicts an illustrative embodiment of a method 251 in accordance with various aspects described herein. In one or more embodiments, the method 251 can be implemented by an MEC device as shown in FIGS. 2A-B. The method 251 can include the MEC device, at 252, receiving, over a communication network an authentication request from a user device for performing a function utilizing a first authentication method. Further, the method 251 can include the MEC device, at 254, obtaining network intelligence data for a mobile network over the communication network. In addition, the method 251 can include the MEC device, at 256, analyzing device security behavior and the network intelligence data using one or more machine learning applications or one or more artificial intelligence applications. Also, the method 251 can include the MEC device, at 258, identifying a risk level for each of a plurality of authentication methods. In some embodiments, the method 251 can include identifying a risk level for each of a plurality of authentication methods resulting in a plurality of risk levels in response to analyzing device security behavior and the network intelligence data using a machine learning application. The first authentication method can be one of the plurality of authentication methods. Also, the method 251 can include the MEC device, at 260, identifying a first risk level for the first authentication method. Further, the method 251 can include the MEC device, at 262, identifying a second risk level for the function. In addition, the method 251 can include the MEC device, at 264, determining the first risk level is higher than the second risk level. Also, the method 251 can include the MEC device, at 266, identifying a second authentication method from the plurality of authentication methods that is associated with the second risk level. Further, the method 251 can include the MEC device, at 268, identifying a risk threshold. In addition, the method 251 can include the MEC device, at 270, determining the first risk level is above the risk threshold. Also, the method 251 can include the MEC device, at 272, identifying the second risk level is below the risk threshold. Further, the method 251 can include the MEC device, at 274, notifying the user device of the second risk level for the function. In addition, the method 251 can include the MEC device, at 276, providing a recommendation to the user device to utilize the second authentication method to perform the function. In some embodiments, the user device can provide an authentication request to the MEC device perform the function utilizing the second authentication method. Further, the MEC device can authenticate the request utilizing the second authentication method and provides access to the user device associated with the service. In addition, the user device performs the function associated with the service, accordingly.

In one or more embodiments, the method 251 can include the MEC device, at 278, determining an amount of risk between the first risk level and risk threshold. Further, the method 251 can include the MEC device, at 280, terminating an access point device associated with a first service based on the amount of risk. In addition, the method 251 can include the MEC device, at 282, terminating operation of the device based on the amount of risk between the first risk level and the risk threshold.

In one or more embodiments, the method 251 can include the MEC device, at 284, determining the first risk level has decreased below the risk threshold. The first authentication method is associated with a first service. In such embodiments, the MEC device can reinstate operations of the access point associated with the first service, if the operations of the access point associated with the first service was previously terminated. In other embodiments, The MEC device can reinstate operations of the MEC device itself, if the operations of the MEC device was previously terminated. Further, the method 251 can include the MEC device, at 286, receiving, over the communication network, a first notification that another MEC device has terminated an access point device for the first service. In addition, the method 251 can include the MEC device, at 288, providing, over the communication network, a second notification to each of a group of user devices associated with the other MEC device that used the first service via the other device. Each of the group of user devices are/were using the first service. The second notification indicates that the device offers the first service to each of the group of user devices as the other MEC device In one or more embodiments, the MEC device comprises a radio intelligent controller and the radio intelligent controller comprises a security monitoring and notification system. The first authentication method is associated with a first service, and the second authentication method is associated with a second service. The device security behavior comprises at least one of user plane behavior on the mobile network and control plane behavior on the mobile network. The network intelligence data comprises historical data of a plurality of user devices accessing services on the mobile network, events occurring in the mobile network, time of day data associated with the plurality of user devices accessing the services on the mobile network, trending data associated with the plurality of user devices accessing the services on the mobile network, or a combination thereof. The first authentication method and the second authentication method comprise one of username/password credentials associated with the device, multifactor authentication, username/password credentials for a service, facial identification, or a combination thereof. The first authentication method comprises username/password credentials for a first service, the identifying of the first risk level comprises detecting a security breach for the first service, and the second authentication method comprises user/name credentials for a second service. The first authentication method comprises username/password credentials for a first service, the identifying of the first risk level comprises detecting a security breach for the first service, and the second authentication method comprises user/name credentials associated with the device. The first authentication method comprises username/password credentials for a first service, the identifying of the risk first level comprises detecting a security breach for the first service, and the second authentication method comprises multifactor authentication.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Further, blocks in FIG. 2C can be performed in response to other blocks.

In addition, portions of embodiments can be combined with other portions of embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 230, 250 and method 251 presented in FIGS. 1, 2A, 2B, 2C, 2D, and 3. For example, virtualized communication network 300 can facilitate in whole or in part determining an authentication method to access a service on a network device based on a security risk and providing a recommendation for another authentication method to access the service.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
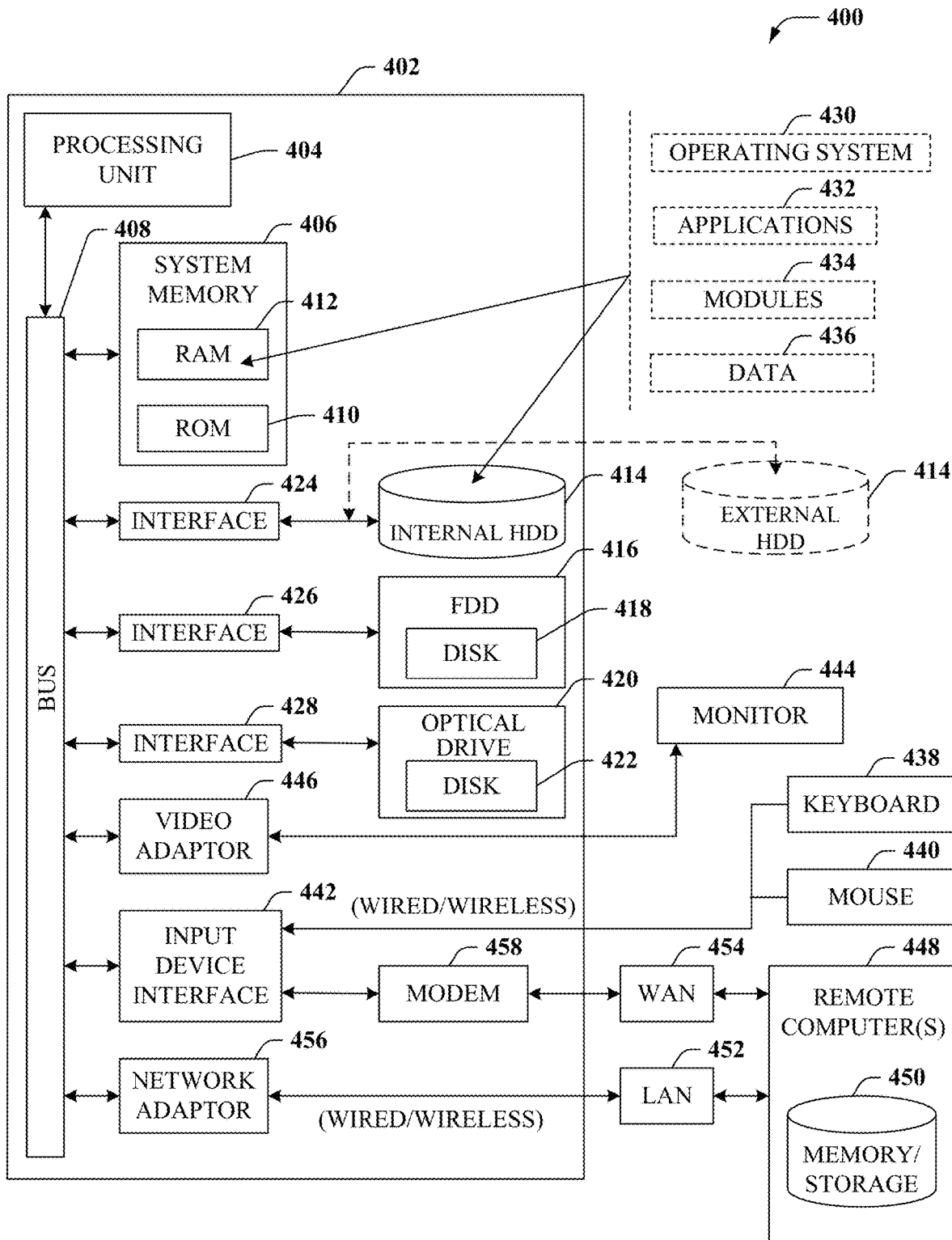
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part determining an authentication method to access a service on a network device based on a security risk and providing a recommendation for another authentication method to access the service. Further, the MEC devices, AP devices, devices within the ONAP, and the user devices in FIGS. 2A-2B can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
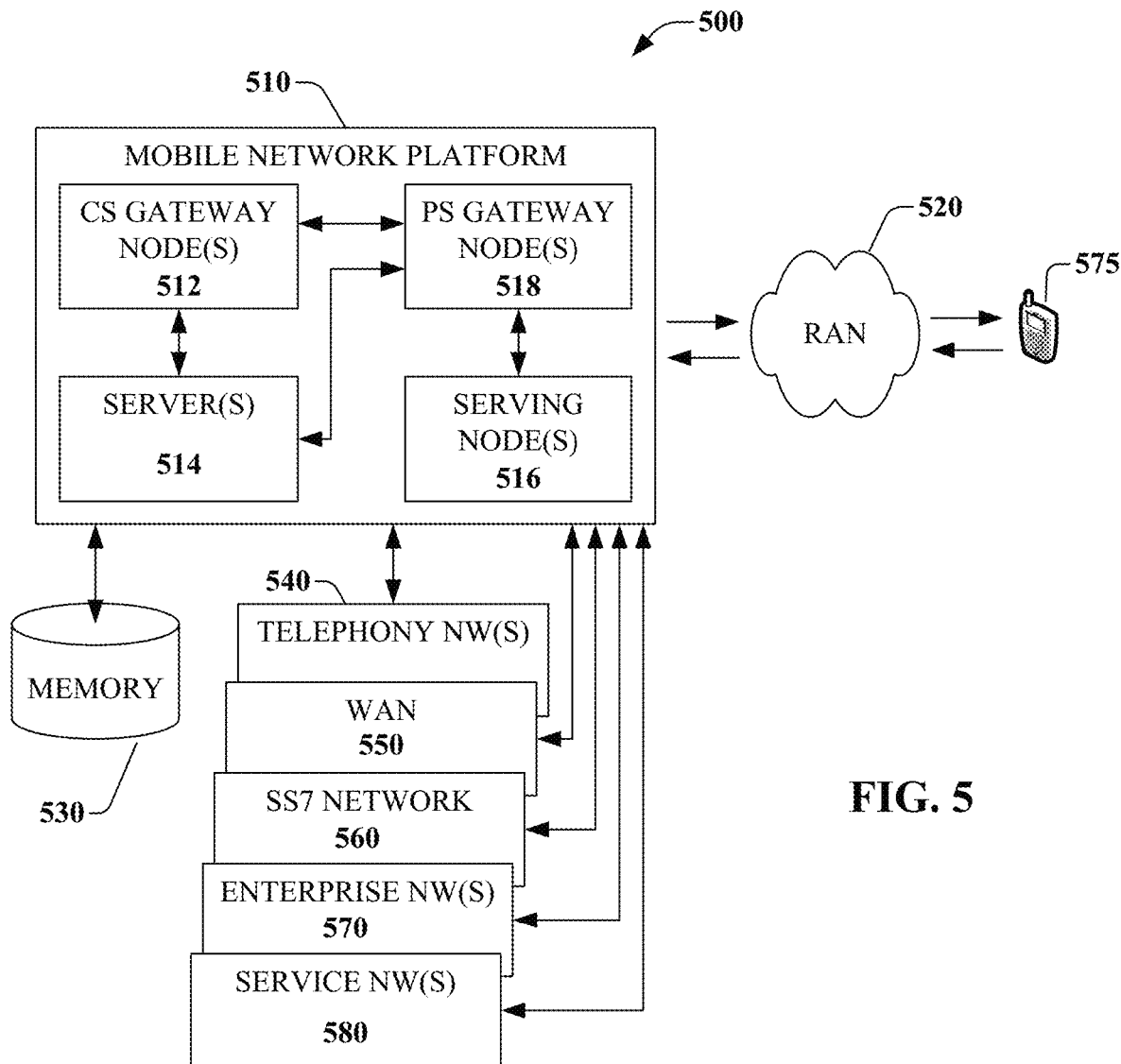
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part determining an authentication method to access a service on a network device based on a security risk and providing a recommendation for another authentication method to access the service. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
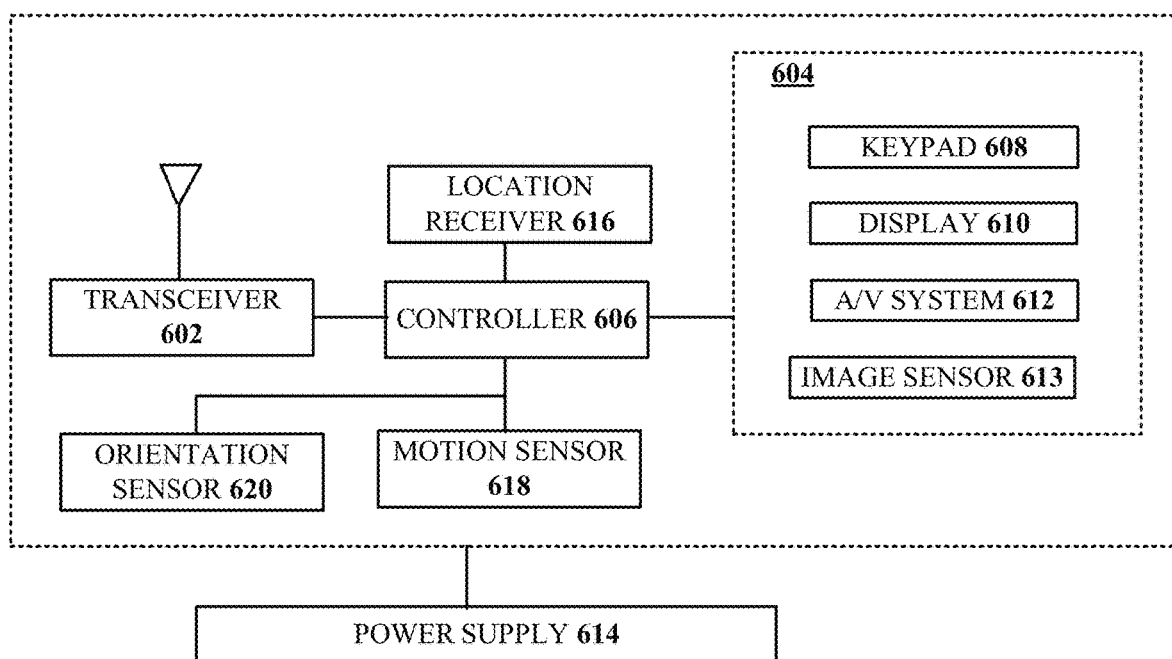
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part determining an authentication method to access a service on a network device based on a security risk and providing a recommendation for another authentication method to access the service. Further, the MEC devices, AP devices, devices within the ONAP, and the user devices in FIGS. 2A-2B can comprise computing device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence(class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A network edge device, comprising:
a processing system including a processor at a proximal edge of a wide-area network; and
a memory that stores executable instructions that, when executed by the processing system, facilitate performance of operations, the operations comprising:
receiving, over a mobile communication network, an authentication request from a user device for performing a function utilizing a first authentication method, wherein the authentication request identifies the function and the first authentication method;
obtaining network intelligence data, the network intelligence data including: historical data of other network devices accessing services via the wide-area network and over the mobile communication network, an identification of events occurring in the mobile communication network, time of day data associated with a plurality of user devices accessing the services, and trending data associated with the plurality of user devices accessing the services on the mobile communication network;
analyzing a security behavior of the network edge device;
identifying a security risk level for each of a plurality of authentication methods resulting in a plurality of security risk levels using a machine learning application configured to apply pattern matching and analysis to the network intelligence data, wherein the first authentication method is one of the plurality of authentication methods, wherein the identifying of the security risk level for each of the plurality of authentication methods is based on an analysis of network element security behaviors for the other network devices, the network element security behaviors being identified based on user plane messages and control plane messages in the mobile communication network that indicate a security breach or a security risk;
identifying a first security risk level of the plurality of security risk levels associated with the first authentication method, based on the security behavior of the network edge device and the network intelligence data for the other network devices;
identifying a second security risk level of the plurality of security risk levels associated with the function;
determining the first security risk level associated with the first authentication method corresponds to a higher risk than the second security risk level associated with the function; and
responsive to the determining:
identifying a second authentication method from the plurality of authentication methods that is associated with the second security risk level;
notifying the user device of the second security risk level for the function; and
providing a recommendation to the user device to utilize the second authentication method to perform the function.

2. The network edge device of claim 1, further comprising a multi-access edge computing device, wherein the multi-access edge computing device further comprises a radio intelligent controller, and wherein the radio intelligent controller further comprises a security monitoring and notification system.

3. The network edge device of claim 1, wherein the first authentication method is associated with a first service, and wherein the second authentication method is associated with a second service.

4. The network edge device of claim 1, wherein the network intelligence data further comprises historical data of a plurality of user devices accessing services on the mobile communication network, events occurring in the mobile communication network, time of day data associated with the plurality of user devices accessing the services on the mobile communication network, trending data associated with the plurality of user devices accessing the services on the mobile communication network, or a combination thereof.

5. The network edge device of claim 1, wherein the operations further comprise:
identifying a risk threshold; and
determining the first security risk level is above the risk threshold.

6. The network edge device of claim 5, wherein the operations further comprise:
determining an amount of risk between the first security risk level and the risk threshold; and
triggering an alert responsive to the amount of risk between the first security risk level and the risk threshold exceeding an alert threshold.

7. The network edge device of claim 5, wherein the operations further comprise:
determining a number of user devices utilizing the first authentication method; and
terminating operation of the network edge device responsive to the number of user devices utilizing the first authentication method exceeding a threshold number of user devices.

8. The network edge device of claim 6, wherein the first authentication method is associated with a first service, wherein the operations further comprise:
 terminating an access point device associated with the first service based on the amount of risk between the first security risk level and the risk threshold, wherein the access point device is communicatively coupled to the network edge device.

9. The network edge device of claim 5, wherein the operations further comprise:
 determining the first security risk level has decreased below the risk threshold, wherein the first authentication method is associated with a first service;
 receiving, over the mobile communication network, a first notification that another device has terminated an access point device for the first service; and
 providing, over the mobile communication network, a second notification to each of a group of user devices associated with the another device, wherein each of the group of user devices are using the first service, wherein the second notification indicates that the network edge device offers the first service to each of the group of user devices as the another device.

10. The network edge device of claim 1, wherein the first authentication method and the second authentication method further comprise one of username/password credentials associated with the user device, multifactor authentication, username/password credentials for a service, facial identification, or a combination thereof.

11. The network edge device of claim 1, wherein the first authentication method comprises username/password credentials for a first service, wherein the identifying of the first security risk level comprises detecting a security breach for the first service, and wherein the second authentication method further comprises user/name credentials for a second service.

12. The network edge device of claim 1, wherein the first authentication method comprises username/password credentials for a first service, wherein the identifying of the first security risk level comprises detecting a security breach for the first service, and wherein the second authentication method further comprises user/name credentials associated with the user device.

13. The network edge device of claim 1, wherein the first authentication method comprises username/password credentials for a first service, wherein the identifying of the first security risk level comprises detecting a security breach for the first service, and wherein the second authentication method further comprises multifactor authentication.

14. A non-transitory, machine-readable medium, comprising executable instructions that, when executed by a processing system including a processor, facilitate performance of operations, the operations comprising:
 receiving, over a communication network an authentication request from a user device for performing a function utilizing a first authentication method, wherein the authentication request identifies the function and the first authentication method;
 obtaining network intelligence data, the network intelligence data including: historical data of other network devices accessing services via a wide-area network of the communication network, an identification of events occurring in a mobile communication network of the communication network, time of day data associated with a plurality of user devices accessing the services, and trending data associated with the plurality of user devices accessing the services on the mobile communication network;
 analyzing a security behavior of the processing system;
 identifying a risk level each of a plurality of authentication methods resulting in a plurality of risk levels using a machine learning application, wherein the first authentication method is one of the plurality of authentication methods;
 identifying a first risk level that is associated with the first authentication method and identifying a second risk level that is associated with the function, based on the security behavior of the processing system and the network intelligence data, wherein the identifying of the first risk level is based on an analysis of network element security behaviors for the other network devices, the network element security behaviors being identified based on user plane messages and control plane messages in the mobile communication network that indicate a security breach;
 identifying a second authentication method from the plurality of authentication methods that is associated with the second risk level;
 identifying a risk threshold; and
 determining the first risk level associated with the first authentication method is above the risk threshold and the second risk level associated with the function is below the risk threshold and in response thereto:
  determining an amount of risk between the first risk level and the risk threshold;
  terminating an access point device associated with a first service based on the amount of risk;
  notifying the user device of the second risk level for the function; and
  providing a recommendation to the user device to utilize the second authentication method to perform the function.

15. The non-transitory, machine-readable medium of claim 14, wherein the access point device is communicatively coupled to the processing system over the communication network.

16. The non-transitory, machine-readable medium of claim 14, wherein the processing system comprises a multi-access edge computing device, wherein the multi-access edge computing device comprises a radio intelligent controller, and wherein the radio intelligent controller comprises a security monitoring and notification system.

17. The non-transitory, machine-readable medium of claim 14, wherein the operations further comprise:
 determining the first risk level associated with the first authentication method is above a second risk threshold that is different from the risk threshold.

18. The non-transitory, machine-readable medium of claim 17, wherein the operations further comprise:
 determining, based on determining the first risk level associated with the first authentication method is above the second risk threshold, a second amount of risk between the first risk level and the second risk threshold, the second amount of risk being different from the amount of risk; and
 terminating second operations of the processing system based on the second amount of risk, the second operations being associated with the first service and the first authentication method.

19. A method, comprising:
 receiving, by a processing system including a processor, over a communication network, an authentication request from a user device for performing a function utilizing a first authentication method, wherein the authentication request identifies the function and the first authentication method;

obtaining, by the processing system, network intelligence data, the network intelligence data including: historical data of other network devices accessing services via a wide-area network of the communication network, an identification of events occurring in a mobile communication network of the communication network, time of day data associated with a plurality of user devices accessing the services, and trending data associated with the plurality of user devices accessing the services on the mobile communication network;

analyzing, by the processing system, a security behavior of the processing system;

identifying, by the processing system, a risk level for each of a plurality of authentication methods resulting in a plurality of risk levels using a machine learning application, wherein the first authentication method is one of the plurality of authentication methods;

identifying, by the processing system, a first risk level of the plurality of risk levels associated with the first authentication method and identifying a second risk level of the plurality of risk levels associated with the function, based on the security behavior of the processing system and the network intelligence data, wherein the identifying of the first risk level and the identifying of the second risk level are based on an analysis of network element security behaviors for the other network devices, the network element security behaviors being identified based on user plane messages and control plane messages in the mobile communication network that indicate a security breach, a security risk, or a combination thereof;

identifying, by the processing system, a second authentication method from the plurality of authentication methods that is associated with the second risk level;

identifying, by the processing system, a risk threshold; and determining, by the processing system, the first risk level is above the risk threshold and the second risk level is below the risk threshold and in response thereto:

notifying, by the processing system, the user device of the second risk level for the function;

providing, by the processing system, over the communication network, a recommendation to the user device to utilize the second authentication method to perform the function;

determining, by the processing system, the first risk level has decreased below the risk threshold, wherein the first authentication method is associated with a first service;

receiving, by the processing system, over the communication network, a first notification that another processing system has terminated an access point device for the first service; and providing, by the processing system, over the communication network, a second notification to each of a group of user devices associated with the another processing system, wherein each of the group of user devices are using the first service, wherein the second notification indicates that the processing system offers the first service to each of the group of user devices as the another processing system, wherein the group of user devices is included in the plurality of user devices.

20. The method of claim 19, wherein the first service is associated with a media content provider, wherein the function includes a provisioning of payment information, the payment information including credit card information and electronic payment information, and wherein the first service provides at least a second function, the at least a second function including streaming media content and providing access to download media content.

* * * * *